US009266564B1

(12) United States Patent
Arora et al.

(10) Patent No.: US 9,266,564 B1
(45) Date of Patent: Feb. 23, 2016

(54) REAR RAIL ADAPTED TO INDUCE SPARE TIRE ROTATION IN A REAR-END COLLISION

(71) Applicant: Ford Global Technologies, LLC, Dearborn, MI (US)

(72) Inventors: Rahul Arora, Royal Oak, MI (US); Sino Johan Van Dyk, Plymouth, MI (US); Mohamed Ridha Baccouche, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/467,358

(22) Filed: Aug. 25, 2014

(51) Int. Cl.
*B62D 43/04* (2006.01)
*B62D 21/15* (2006.01)
*B60R 19/02* (2006.01)

(52) U.S. Cl.
CPC .............. *B62D 21/152* (2013.01); *B60R 19/02* (2013.01); *B62D 43/04* (2013.01)

(58) Field of Classification Search
CPC .............. B60K 2015/0638; B60K 2015/0675; B60R 19/02; B62D 21/152; B62D 43/00; B62D 43/04; B62D 43/045; B62D 43/06; B62D 43/10
See application file for complete search history.

(56) References Cited

U.S. PATENT DOCUMENTS

| 2,028,945 | A | * | 1/1936 | Morrison | B60R 19/26 224/490 |
| 2,358,481 | A | * | 9/1944 | Slack | B62D 43/04 224/42.23 |
| 2,417,952 | A | * | 3/1947 | Selzer | B62D 43/04 224/42.23 |
| 2,584,233 | A | * | 2/1952 | Selzer | B62D 43/04 414/466 |
| 2,806,616 | A | * | 9/1957 | Fisher | B62D 43/04 414/466 |
| 3,428,200 | A | * | 2/1969 | Graves | B62D 43/04 224/42.21 |
| 3,698,609 | A | * | 10/1972 | Lund | B60D 1/06 224/402 |
| 3,904,093 | A | * | 9/1975 | Hanela | B62D 43/04 224/42.21 |
| 4,087,032 | A | * | 5/1978 | Miller | B62D 43/04 224/42.23 |
| 4,093,088 | A | * | 6/1978 | Hildebrandt | B62D 43/04 224/42.21 |
| 4,896,910 | A | * | 1/1990 | Carter | B60D 1/56 224/402 |
| 5,110,177 | A | * | 5/1992 | Akio | B62D 21/11 280/784 |
| 5,114,184 | A | * | 5/1992 | Shimomura | B62D 21/155 280/784 |
| 5,174,628 | A | * | 12/1992 | Hayatsugu | B60K 15/03 296/187.11 |
| 5,419,609 | A | * | 5/1995 | Kmiec | B62D 21/152 296/187.11 |
| 5,992,885 | A | * | 11/1999 | Fukagawa | B60G 3/202 280/830 |
| 6,231,097 | B1 | | 5/2001 | Schell et al. | |
| 7,976,091 | B2 | | 7/2011 | Yamaguchi et al. | |
| 8,328,272 | B2 | | 12/2012 | Fujimura | |
| 2009/0001767 | A1 | * | 1/2009 | Yamaguchi | B60K 15/063 296/203.04 |
| 2010/0102095 | A1 | * | 4/2010 | Houser | B60G 13/16 224/42.23 |

FOREIGN PATENT DOCUMENTS

DE 2045630 A1 * 6/1971 ........... B60K 15/063
DE 2313588 A1 * 10/1973 ............. B60R 19/34

(Continued)

*Primary Examiner* — Glenn Dayoan
*Assistant Examiner* — Paul Chenevert
(74) *Attorney, Agent, or Firm* — Jason Rogers; Brooks Kushman P.C.

(57) ABSTRACT

A vehicle body structure is described that includes a pair of rear rails, a bumper beam and a spare tire compartment including a spare tire. The rear rails have a rear segment aligned with the bumper beam, a middle segment disposed above the rear segment and a front segment that extends downwardly from the middle segment. After a 50 mph 70% Movable Deformable Barrier rear impact test, the spare tire compartment including the spare tire hinges downwardly to create added crush space and the middle section is raised upwardly to reduce the extent of intrusions into the passenger compartment.

13 Claims, 4 Drawing Sheets

(56) References Cited

FOREIGN PATENT DOCUMENTS

| DE | 2621922 | A1 | * | 1/1977 | ............ B62D 21/152 |
| DE | 2828715 | B1 | * | 9/1979 | ............ B60K 15/063 |
| DE | 4323621 | C1 | * | 9/1994 | .............. B62D 43/04 |
| DE | 19604215 | A1 | * | 8/1996 | .............. B60R 19/00 |
| EP | 1209065 | A2 | * | 5/2002 | .............. B62D 43/10 |
| GB | 316894 | A | * | 1/1930 | ............... B60R 19/20 |
| JP | 4206523 | B2 | * | 1/2009 | ........... B62D 43/045 |
| JP | 2014008835 | | | 1/2014 | |
| WO | 2014010440 | | | 1/2014 | |
| WO | WO 2015033374 | | * | 3/2015 | ........... B62D 25/087 |

* cited by examiner

REAR RAIL ADAPTED TO INDUCE SPARE TIRE ROTATION IN A REAR-END COLLISION

TECHNICAL FIELD

This disclosure relates to the structure of a rear rail of a vehicle that predisposes a spare tire to rotate to provide additional crush space in a rear-end collision.

BACKGROUND

Under current motor vehicle safety standards automotive vehicles are tested in a 50 MPH 70% offset Moving Deformable Barrier (MDB) rear impact test. The test is intended to test fuel system integrity in a rear-end collision. In the test procedure, 70% of the rear of the vehicle is impacted by a 1,368 kg deformable barrier at 80 km/h.

An important factor in passing the MDB test is providing sufficient crush space in the vehicle to absorb the force of the impact. One possible solution is to reduce the volume of the fuel tank but this is undesirable because it reduces the range of the vehicle between refueling. In many vehicle designs a spare tire is attached to the vehicle below the rear trunk floor. The spare tire reduces the available crush space and results in additional deformation, higher plastic strain and increased pressure applied to the fuel tank. The spare tire is usually laterally squeezed in the crush zone in the MDB test and reduces the available crush space.

Referring to FIG. 1, a rear rail "R" of a vehicle is illustrated in a side elevation view. The rear rail is aligned at the same height as the crush cans "C" and rear bumper "RB" and is approximately 137 mm above the frame "F" at the passenger compartment. This arrangement causes the spare tire to be laterally squeezed in the MDB test.

This disclosure is directed to solving the above problems and other problems as summarized below.

SUMMARY

According to one aspect of this disclosure, a vehicle body structure is disclosed that comprises a rear bumper beam, a spare tire, and a pair of rear rails. The rear rails each have a rear segment vertically aligned with the bumper, and a middle segment vertically offset above the rear segment. The diameter of the spare tire is vertically aligned with the bumper beam. In a rear-end collision, the spare tire rotates with the rear segment to move a rear portion of the spare tire downwardly below the rear bumper beam.

According to another aspect of this disclosure, a vehicle body structure is disclosed for absorbing a load in a rear-end collision. The vehicle body structure comprises a bumper beam that receives the load and two rear rails that each includes a rear segment and a middle segment disposed above the rear segment. A spare tire is disposed between the rear rails. The load from the rear-end collision bends the rear rail at a juncture of the middle segment and rear segment to move a rear portion of the spare tire downwardly below the middle segment.

According to yet another aspect of this disclosure, a vehicle body structure is disclosed for absorbing a load in a rear-end collision. The vehicle body structure includes a bumper beam that initially receives the load and a pair of rear rails that are attached to the bumper beam. The rear rails each include a middle segment disposed above the front segment. The load from the rear-end collision raises the rear rail at a juncture of the middle segment and the front segment to reduce the extent of intrusion into a passenger compartment area.

According to other alternative aspects of this disclosure, the rear rail may include a front segment that extends from the middle segment to the rocker panel that is disposed below the vertical level of the bumper. A bend may be formed in the rear rail where the front segment and middle segment meet, wherein in a rear collision the middle segment is configured to be driven upwardly at the bend. The vertical center of gravity of the spare tire is disposed below the middle segment.

The cross-sections of the front segment, the middle segment and the rear segment of the rear rail may be the same. A bend may be provided at the juncture of the front rail segment and the middle segment that creates a stress riser that predisposes the middle segment to be raised in a rear-end collision. A second bend may be provided at the juncture of the rear rail segment and the middle segment that creates a stress riser that predisposes the rear rail to bend in a downward hinging motion relative to the middle segment in a collision.

The spare tire may be disposed in a horizontal plane that rotates in a rear-end collision to a position with a rear-end of the spare tire being moved below a front end of the tire.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
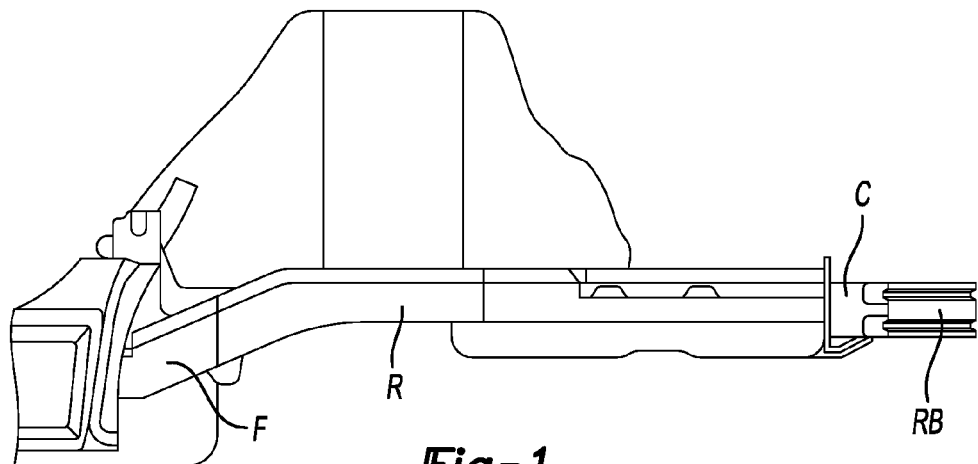
FIG. 1 is a fragmentary side elevation view of a vehicle showing a prior art rear rail, wheel housing and bumper assembly.
Figure 2:
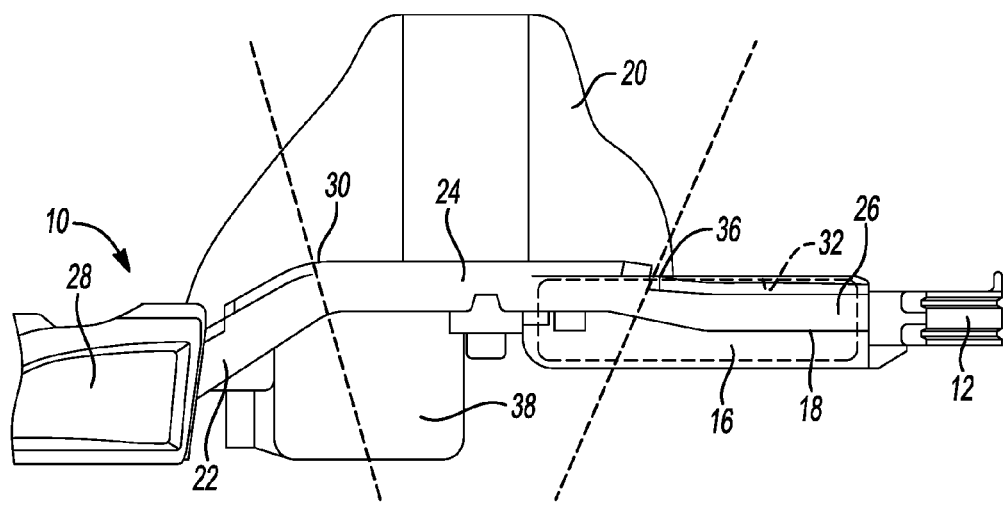
FIG. 2 is a fragmentary side elevation view of a vehicle showing a rear rail made according to this disclosure, wheel housing and bumper assembly.

Referring to FIG. 2, a vehicle body generally indicated by reference numeral 10 is partially shown including the rear bumper beam 12, or bumper, a spare tire compartment 16, a rear rail 18 and a wheel housing 20. Modifications in the disclosed design compared to the prior art structure shown in FIG. 1 relate to the structure of the rear rail 18. The rear rail 18 includes a front/rear rail 22, or front segment, a mid/rear rail 24, or middle segment, and a rear/rear rail 26, or rear segment.

The front segment 22 extends from a rocker panel 28 to the middle segment 24. The middle segment 24 extends from the front segment 22 in a horizontal direction to the rear segment 26. The middle segment 24 in the illustrated embodiment of FIG. 2 is 171 mm above a centerline of the frame of the passenger compartment. A front/mid bend 30, which may also be referred to herein as a front juncture or a front stress riser, is provided between the front segment 22 and the middle segment 24. A spare tire 32 is shown in phantom lines in FIG. 2.

A mid/rear bend 36, which may also be referred to as a mid/rear juncture or rear stress riser herein, is provided at the juncture of the middle segment 24 and the rear segment 26. In the improved design, the fuel tank 38 is located between the wheel housings 20 in the area of the front segment 22, the front/mid bend 30 and the middle segment 24. With the fuel tank being located further rearward in the vehicle compared to the prior art (as shown in FIG. 1), there is a greater need for added crush space between the fuel tank 38 and the rear bumper beam 12.

Figure 3:
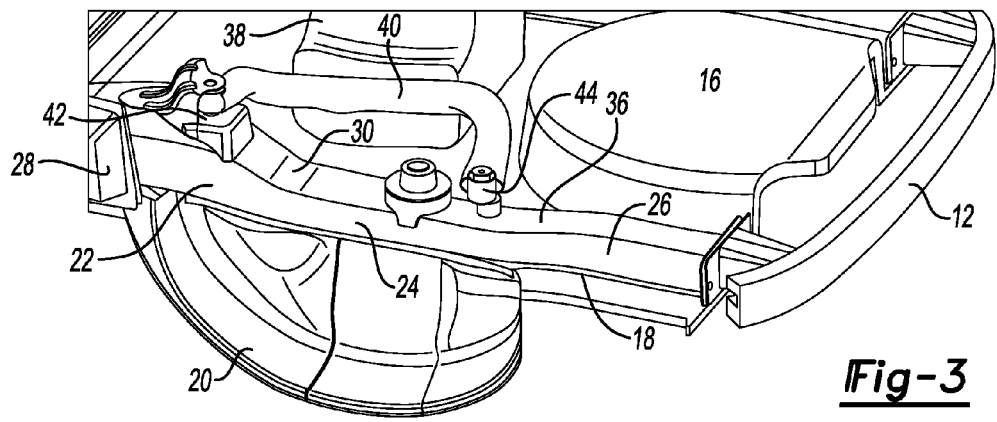
FIG. 3 is a fragmentary bottom perspective view of the vehicle showing a rear rail made according to this disclosure, wheel housing and bumper assembly.

Referring to FIG. 3, the rear portion of the vehicle 10 is shown that includes the rear bumper beam 12 and the spare tire compartment 16. The rear rail 18 is shown to include the front segment 22, middle segment 24, and rear segment 26. The rear rail 18 spans the wheel housing 20 and is connected on its front end to the rocker panel 28. A front stress riser 30 is provided between the front segment 22 and middle segment 24 and a rear stress riser 36 is provided between the middle segment 24 and the rear segment 26.

FIG. 3 is a bottom perspective view and shows a rear sub-frame arm 40 that is connected between a front sub-frame arm connector 42 and a rear sub-frame arm connector 44. The front sub-frame connector 42 is secured to the rear rail 18 near the rocker panel 28. The rear sub-frame arm connector 44 is connected to the rear rail 18 just in front of the rear stress riser 36. The rear sub-frame arm 40 provides additional strength and reinforces the rear rail 18 in an area spanning the front segment 22 and the middle segment 24. The rear sub-frame arm 40 reinforces the rear rail 18 in front of the rear stress riser 36 and facilitates allowing the rear segment 26 to hinge downwardly in a rear collision, as will be described more specifically below with reference to FIGS. 4A-4D.

Figure 4A:
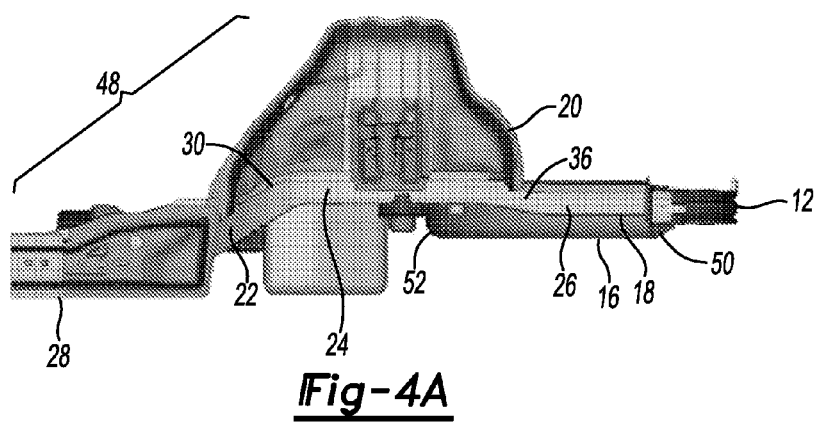
FIGS. 4A-4D are a series of side elevation views of the vehicle showing a rear rail made according to this disclosure, wheel housing and bumper assembly at four different time intervals during a rear-end collision.
Figure 4B:
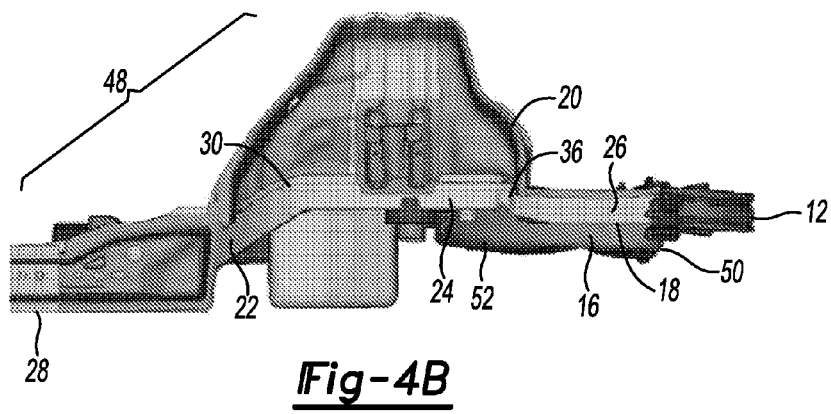
Figure 4C:
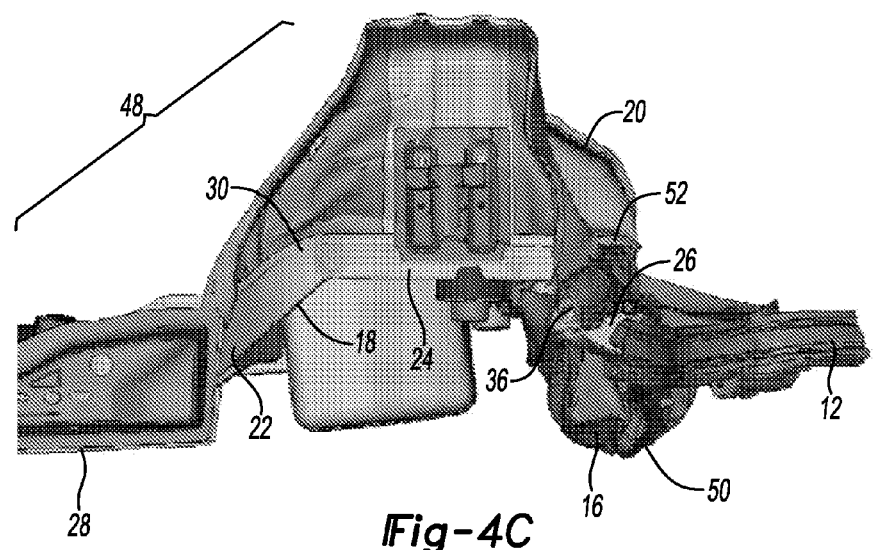
Figure 4D:
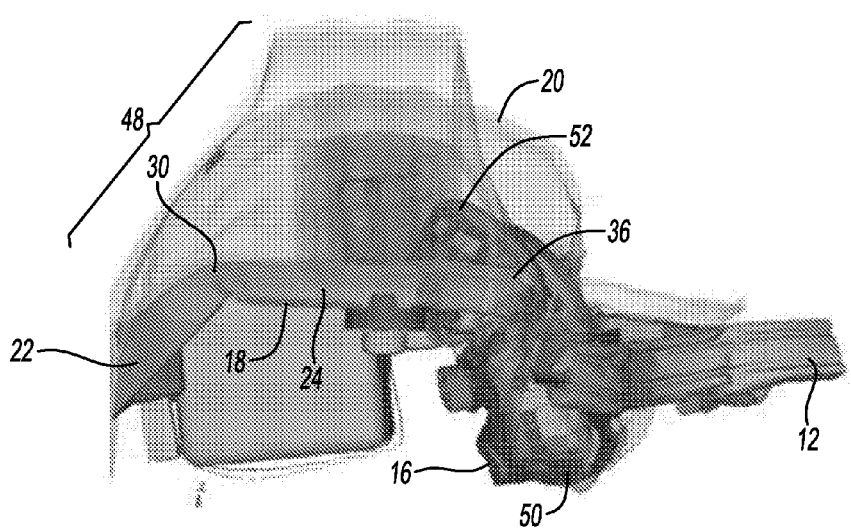

Referring to FIG. 4A-4D, a series of CAE (Computer Aided Engineering) simulations of a rear collision applied to the vehicle body shown in FIG. 2 is illustrated. FIG. 4A depicts the rear rail assembly at 0 milliseconds, prior to the rear end collision. FIG. 4B shows the rear rail structure at 20 milliseconds, FIG. 4C shows the rear rail structure assembly at 60 milliseconds, and FIG. 4D shows the rear rail assembly at 120 milliseconds after the rear end collision.

The portions of the vehicle illustrated in FIGS. 4A-4D include the rear rail 18, the wheel housing 20 and the rear bumper 12. The rear rail includes the front/rear rail 22, mid/rear rail 24 and rear/rear rail 26. The front/mid bend 30 is provided between the front segment 22 and the middle segment 24. The mid/rear bend 36 is provided between the middle segment 24 and the rear segment 26.

Referring to FIG. 4A, the spare tire compartment 16 extends from the rear end of the rear rail 18 to an intermediate location on the middle segment 24 prior to a rear-end collision. The passenger compartment is generally indicated by reference numeral 48 and is located above the rocker panel 28 and in front of the wheel housing 20.

Referring to FIG. 4B, the result of the rear end collision is shown at the 20 millisecond point at which the rear bumper 12 is impacted and causes an initial bending at the rear stress riser 36. At this point, the spare tire compartment 16 is shown as it begins to be rotated or hinged downwardly.

Referring to FIG. 4C, the result of the rear end collision is shown at the 60 millisecond point at which the offset at the front/mid bend 30 and the offset at the mid/rear bend 36 cause the rear rail to deform at the front stress riser 30 and the rear stress riser 36. The spare tire compartment 16 including the spare tire 32 is rotated to move the rear portion 50 of the spare tire compartment 16 below the front portion 52 of the spare tire compartment 16.

Referring to FIG. 4D, the result of the rear end collision is shown at the 120 millisecond point with the tire being rotated to a greater extent. The rear portion 50 of the spare tire compartment 16 is shown below the front portion 52 of the spare tire compartment 16. Also as shown in FIG. 4D, dual bends in the rear rail 18 cause the front/rear rail 22 to hinge relative to the rocker panel 28 causing the mid/rear rail 24, or middle segment, to raise during the rear end collision event. Raising the mid/rear rail results in less intrusion into the passenger compartment 48 compared to the prior art, as shown in FIG. 1.

Figure 5A:
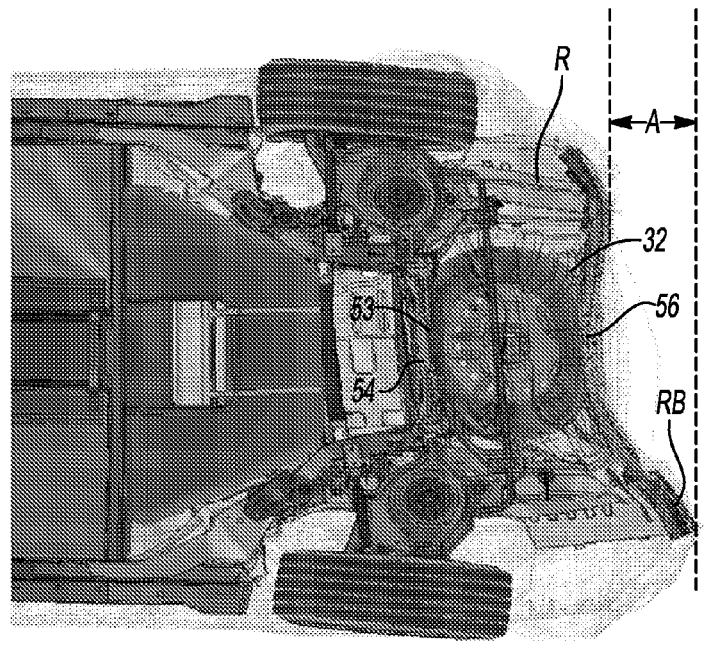
FIG. 5A is a bottom plan view of the prior art design shown in FIG. 1 after a rear-end collision.

Referring to FIG. 5A, the vehicle 10 made according to the prior art design shown in FIG. 1 is shown after a 50 mph 70% offset Movable Deformable Barrier (MDB) rear impact test. The spare tire 32 is shown to be compressed axially between the bumper beam 12 and the rear axle 53. A front portion 54 of the spare tire 32 is shown engaging the rear axle 53 and a rear portion 56 of the spare tire 32 is shown being engaged by the bumper 12. The spare tire 32 remains in a horizontal orientation aligned with the rear bumper 12. The crush space between the original bumper location and the rear axle 53 in a simulated test was 254 mm.

Figure 5B:
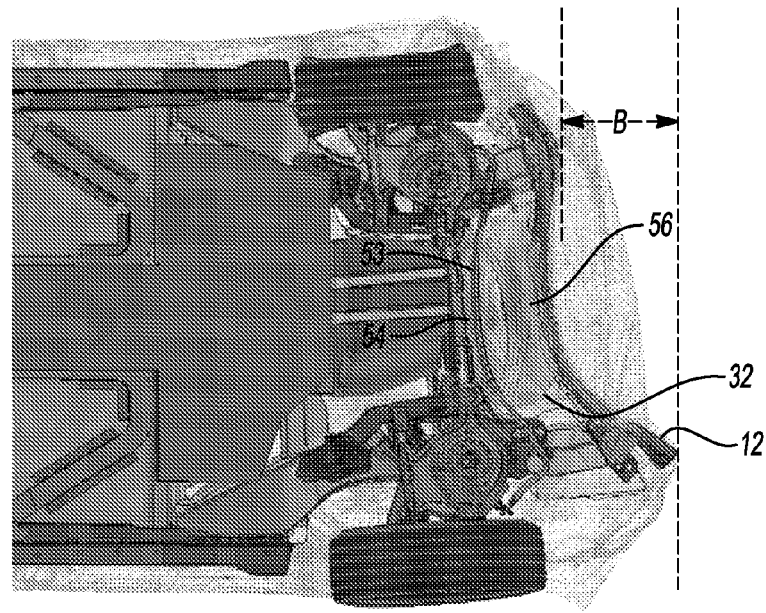
FIG. 5B is a bottom plan view showing a rear rail made according the embodiment of FIG. 2 of after a rear-end collision.

Referring to FIG. 5B, the vehicle 10 made according to the embodiment of FIG. 2 is shown after a 50 mph 70% MDB rear impact test. The spare tire is shown rotated (or hinged downwardly) with the front portion 54 of the spare tire 32 above the rear portion 56 of the spare tire 32. The crush space between the original bumper location and the rear axle 53 in a simulated test was 371 mm. The increase in crush space with the embodiment of FIG. 2 is predicted to be more than a 45% increase compared to the design shown in FIG. 5A.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A vehicle body structure comprising:
   a bumper;
   a spare tire compartment vertically aligned with the bumper; and
   a pair of rear rails having a rear segment vertically aligned with the bumper, and a middle segment vertically offset above the rear segment, wherein the rear segment rotates a rear portion of the spare tire compartment downwardly below the bumper in a rear-end collision.

2. The vehicle body of claim 1 wherein a spare tire is disposed in a horizontal plane in the spare tire compartment and in the rear-end collision rotates to a position with the rear portion of the spare tire being below a front portion of the tire.

3. The vehicle body of claim 1 wherein a vertical center of gravity of the spare tire compartment including a spare tire is disposed below the middle segment.

4. The vehicle body of claim 1 wherein the rear rails include a front segment that extends from the middle segment to a rocker panel that is disposed below a vertical level of the bumper.

5. The vehicle body of claim 4 wherein a front-mid bend is formed in the rear rails where the front segment and middle segment meet, wherein a mid-rear bend is formed in the rear rails where the middle segment and rear segment meet, and wherein in a rear-end collision the middle segment is configured to be driven upwardly between the front-mid bend and the mid-rear bend.

6. The vehicle body of claim 5 wherein the mid-rear bend creates a rear stress riser that predisposes the rear rails to bend in a downward hinging motion relative to the middle segment in a rear-end collision.

7. The vehicle body of claim 5 wherein the front-mid bend creates a front stress riser that predisposes the middle segment to be raised in the rear-end collision.

8. The vehicle body of claim 7 wherein the mid-rear bend creates a rear stress riser that predisposes the rear rails to bend in a downward hinging motion relative to the middle segment in the rear-end collision.

9. A vehicle body structure absorbing a rear-end collision load comprising:
- a bumper that receives the load;
- rear rails including a rear segment and a middle segment disposed above the rear segment; and
- a spare tire attached to the structure between the rear rails, wherein the load bends the rear rails at a juncture of the middle segment and rear segment to move a rear portion of the spare tire downwardly below the middle segment.

10. The vehicle body structure of claim 9 wherein the rear rails each further comprise a front segment disposed below the middle segment and extending downwardly to a rocker panel, wherein the load transferred to the middle segment raises the rear rail at the juncture of the middle segment and the front segment to reduce an extent of intrusion into a passenger compartment area.

11. The vehicle body structure of claim 10 wherein a mid-rear bend at the juncture of the rear segment and the middle segment creates a stress riser that predisposes the rear rails to bend in a downward hinging motion relative to the middle segment in the rear-end collision.

12. The vehicle body structure of claim 10 wherein a front-mid bend at the juncture of the front segment and the middle segment creates a front stress riser that predisposes the middle segment to be raised in the rear-end collision.

13. The vehicle body structure of claim 12 wherein a mid-rear bend at the juncture of the rear segment and the middle segment creates a rear stress riser that predisposes the rear rails to bend in a downward hinging motion relative to the middle segment in the rear-end collision to increase an amount of crush space available for impacts to the bumper.

\* \* \* \* \*